Patented Jan. 2, 1945

2,366,495

UNITED STATES PATENT OFFICE 2,366,495

SYNTHETIC PRODUCTS HAVING MOLECULARLY ORIENTED STRUCTURE

Gaetano F. D'Alelio, Pittsfield, Mass., assignor to General Electric Company, a corporation of New York No Drawing. Application July 3, 1942, Serial No. 449,678

8 Claims. (Cl. 18—54)

This invention relates to novel synthetic compositions wherein the molecules have been oriented so that they are parallel with the major surface. More particularly, this invention relates to formed structures which exhibit characteristic crystalline X-ray diffraction patterns and comprise a molecularly oriented copolymer of acrylonitrile and an ester of itaconic acid having the structural formula:

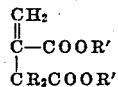

where R is a member of the class consisting of hydrogen and alkyl radicals having a maximum of four carbon atoms, and R' is a radical selected from the class consisting of alkyl radicals, aralkyl radicals, aryl radicals, and alkaryl radicals. Illustrative examples of radicals represented by R in the above formula are: methyl, ethyl, propyl, isopropyl, butyl, tertiary butyl, secondary-butyl, etc. Preferably R is hydrogen. Illustrative examples of radicals represented by R' in the above formula are: alkyl, e. g., methyl, ethyl, propyl, isopropyl, butyl, isobutyl, secondary-butyl, amyl, hexyl, decyl, etc.; cycloalkyl, e. g., cyclopentyl, cyclohexyl, methylcyclopentyl, propylcyclopentyl, amylcyclopentyl, methylcyclohexyl, dimethylcyclohexyl, etc.; aryl, e. g., phenyl, xenyl, naphthyl, etc.; alkaryl, e. g., tolyl, xylyl, ethylphenyl, propylphenyl, isopropylphenyl, etc.; aralkyl, e. g., benzyl, phenethyl, phenylpropyl, phenylbutyl, etc.

As disclosed in my copending application, Serial No. 445,808, filed June 4, 1942, and assigned to the same assignee as the present invention, molecularly oriented bodies may be prepared from copolymers of acrylonitrile and esters of acrylic acids. I have now found that other copolymers in addition to those of acrylonitrile and esters of acrylic acids may be used in producing molecularly oriented, formed bodies. Such copolymers are, for instance, the copolymers of acrylonitrile and esters of itaconic acids with which this invention is especially concerned. All copolymers containing these two components are not susceptible to molecular orientation. However, if I prepare copolymers containing from 40–80% acrylonitrile and 60–20% of the ester and preferably from 50–80% nitrile and 50–20% ester, a composition is obtained which may be formed into the shape of filaments, films, tubes, etc., by extrusion or precipitation methods. Such shaped articles may be cold-drawn to yield molecularly oriented bodies having a highly increased strength and flexibility. These oriented bodies exhibit the characteristic crystalline X-ray diffraction pattern. Threads made from such compositions have outstanding tensile strength of the order of 40,000–50,000 pounds per square inch and excellent pliability as seen by the fact that they may be tied into tight knots without breaking.

Acrylonitrile and its copolymers with esters of itaconic acids possess other outstanding properties which make copolymers formed therefrom very desirable for use in formed articles. For example, they have a very high softening point and an excellent resistance to the action of solvents.

Not all polymers and copolymers of acrylonitrile are capable of being cold-drawn to molecularly oriented bodies. For instance, copolymers of acrylonitrile and itaconic esters having substantially greater than 80% acrylonitrile are too hard and brittle and have too high a softening point to be readily adapted to the methods of forming molecularly oriented structures. Copolymers comprising substantially less than 40% acrylonitrile cannot be cold-drawn to produce a molecularly oriented structure which exhibits the characteristic crystalline X-ray diffraction pattern.

Generally speaking, it may be stated that thermoplastic polymers and copolymers of all types possess little or no tendency to form the crystalline X-ray diffraction pattern exhibited by the compositions of the present invention. For instance, the esters of itaconic acids used herein as the copolymerizing component are not in themselves capable of being drawn into fibers, films, tubes, etc., possessing oriented structures, nor can they be cold-drawn in the desired manner when they are copolymerized with such polymerizable material as styrene, vinyl acetate, butadiene, ethyl acrylate, benzyl acrylate, etc. Even acrylonitrile itself cannot be so drawn when copolymerized with such unsaturated compounds as butadiene, styrene, vinyl acetate, etc.

It is to be noted that compounds similar to the itaconic esters such as isomers and compounds related to the isomers of these esters are not copolymerizable with acrylonitrile to yield a composition capable of being cold-drawn. Examples of such esters are dimethyl methyl maleate, diethyl methyl maleate, dimethyl methyl fumarate, diethyl methyl fumarate, dimethyl maleate, diethyl maleate, dimethyl fumarate, diethyl fumarate, etc. For example, mixtures containing

|  | Parts by weight | | | |
| --- | --- | --- | --- | --- |
|  | A | B | C | D |
| Acrylonitrile | 45 | 40 | 35 | 25 |
| Diethyl maleate | 5 | 10 | 15 | 25 |
| Benzoyl peroxide | 0.25 | 0.25 | 0.25 | 0.25 | were each placed in an autoclave and heated at 50° C. After 7¼ hours the above had all been polymerized. In each case a white powder was obtained which possessed an exceedingly strong odor of diethyl maleate. The powder was hard and brittle, did not melt on the hot plate at 140° C. and showed no tendency to fiber formation. Apparently little copolymerization took place and the polymer obtained was largely acrylonitrile.

The same results were obtained when diethyl fumarate was substituted for diethyl maleate, typical compositions used being:

|  | Parts by weight | |
| --- | --- | --- |
|  | A | B |
| Acrylonitrile | 35 | 25 |
| Diethyl fumarate | 15 | 25 |
| Benzoyl peroxide | 0.25 | 0.25 |

The preferred method for forming the oriented articles of this invention involves first the copolymerization of the selected monomers. This may be accomplished by any suitable means. Two satisfactory methods involve the use of an emulsion and of a mass polymerization. The former may be carried out by placing the mixture of monomers or the partially polymerized material in water containing a small amount of an emulsifying agent, e. g., polyvinyl alcohol, polymethacrylic acid, starch acetate, Aerosol, Tergitol, etc., and a catalyst of polymerization. By rapid agitation under the influence of heat, e. g., 70–85° C., a latex is obtained which may be coagulated by the usual methods, e. g., addition of coagulants. The latter method may be carried out by heating the monomeric mixture containing the polymerization catalyst in an autoclave. As the polymerization proceeds the temperature may be increased as the vapor pressure of the mass decreases. The copolymers are freed of easily vaporizable materials, e. g., monomer, low molecular weight polymers, etc., by any suitable method, for example, by sheeting with resultant evaporation or by the use of selective solvents.

The copolymers of this invention may be made into fibers, threads, filaments, films, tubes and the like by any suitable method. For example, I may extrude the copolymer under pressure through a die at elevated temperatures or I may dissolve the polymer in a suitable solvent and reprecipitate it in the desired shape by forcing the solution through a die followed by either evaporation of the solvent or passing it into a precipitant. I prefer to use the extrusion method for shaping the articles of this invention, using temperatures ranging from 150–300° C., depending upon the particular type of polymer being used, since each polymer has a different softening point. Generally speaking, the polymer is heated to some temperature above the softening point, e. g., 15–25° C. above, extruded and rapidly cooled. The articles are cold-drawn at this point, causing the molecules to orient themselves parallel to the direction of the cold-drawing. The extruded or precipitated articles are not in themselves molecularly oriented. It is only after the cold drawing process that they exhibit the characteristic X-ray patterns indicative of the crystalline orientation. The increase in tensile strength and flexibility following this operation is remarkable.

The polymerization catalysts which may be used in carrying out the copolymerization of this invention are varied. For instance, I may use ozone, ozonides, inorganic super oxides, e. g., barium peroxide, sodium peroxide, etc., aliphatic acyl peroxides, e. g., acetyl peroxide, lauryl peroxide, stearyl peroxide, etc., peroxides of the aromatic series, e. g., benzoyl peroxide, toluyl peroxide, para-chlorobenzoyl peroxide, para-nitrobenzoyl peroxide, etc., ketone peroxides, e. g., acetone peroxide, triacetone peroxide, etc., hydrogen peroxide, and derivatives of hydrogen peroxide, e. g., ethyl hydrogen peroxide, diethyl peroxide, etc., aluminum salts such as the halides, e. g., aluminum chloride, etc., mixed organic peroxides, acetyl benzoyl peroxide, etc., various per compounds, e. g., perborates, persulfates and perchlorates, etc., metal compounds of the unsaturated acids as, for instance, cobalt and manganese resinates, linoleates, maleates, etc. I prefer, however, to use benzoyl peroxide for mass polymerizations and hydrogen peroxide or benzoyl peroxide for emulsion polymerization. Any suitable amount of catalyst may be used, but, in general, the catalyst concentration will be within the range of 0.1–2.0% by weight of the whole.

In order that those skilled in the art may better understand the means by which this invention is carried into effect the following examples are given. All parts are by weight.

*Example 1*

| | Parts by weight |
| --- | --- |
| Acrylonitrile | 35 |
| Diethyl itaconate | 15 |
| Benzoyl peroxide | 0.25 |

The above components were placed in an autoclave and the temperature raised to 50° C. and kept there for 2 days. The autoclave was opened and a very tough resin removed. The casting was slightly yellowish and translucent. The copolymer softened at 200–250° C. without melting. The softened, nearly molten resin could be pulled into long fibers which, when subsequently cold-drawn, increased in strength and flexibility. These cold-drawn fibers were typical of molecularly oriented bodies.

*Example 2*

| | Parts by weight |
| --- | --- |
| Acrylonitrile | 25 |
| Diethyl itaconate | 25 |
| Benzoyl peroxide | 0.25 |

These components were placed in an autoclave and the temperature raised to 50° C. and kept there for 2½ days. It was then raised to 85° C. for 24 hours. The hard, extremely tough resin casting was removed. The copolymer showed the same tendency to form fibers as the composition of Example 1. These types of materials form molecularly oriented products with the direction of orientation parallel to the direction of cold drawing.

Example 3

| | Parts by weight |
|---|---|
| Dimethyl itaconate | X (20–50) |
| Acrylonitrile | 100–X (80–50) |
| Benzoyl peroxide | 1 |

A composition of the above ingredients are sealed in an autoclave. A preferred mixture would be one where X=30. The temperature is slowly raised (not in excess of 130° C.) until a highly polymerized mass is obtained. The copolymer is sheeted to remove monomer and prepared for extrusion. Fibers, films, tubes are obtained by extruding the preformed copolymer through the proper die. The cooled, formed body is now caused to form a molecularly oriented article by cold-drawing it to 100–200% its original length. The precipitation method may be used in place of extrusion.

It is preferred in the present invention to use three-component systems of the following types. I am, however, not limited to three-component systems.

Example 4

| | Parts by weight |
|---|---|
| Diethyl itaconate | 5 |
| Acrylonitrile | 70 |
| Dibutyl itaconate | 25 |

Example 5

| | Parts by weight |
|---|---|
| Diethyl itaconate | 30 |
| Acrylonitrile | 65 |
| Dipropyl itaconate | 5 |

Example 6

| | Parts by weight |
|---|---|
| Dimethyl itaconate | 30 |
| Acrylonitrile | 60 |
| Dibutyl itaconate | 10 |

Example 7

| | Parts by weight |
|---|---|
| Diethyl itaconate | 20 |
| Acrylonitrile | 70 |
| Diphenyl itaconate | 10 |

In each of the above examples polymerization may be effected by the emulsion method or by the mass method described in Example 1. No matter which method is used the treatment of the copolymer is the same. A preform is made so that the copolymer will fit the extrusion apparatus. If the precipitation method is used, the copolymer is dissolved in a solvent in some desirable concentration. In both cases the copolymer is extruded through a die although the former method passes the extruded material into cooled air and the latter into a precipitant or heated air where the solvent will evaporate. The extruded article is then cold-drawn to a length 100–200% greater than the original, thus causing a molecular orientation parallel to the major surface and in the direction of cold-drawing.

In addition to or besides dimethyl itaconate, diethyl itaconate, dipropyl itaconate, dibutyl itaconate and diphenyl itaconate used in the examples of this invention, I may also use as copolymerizing materials such esters of itaconic acid as: diisopropyl itaconate, diisobutyl itaconate, dihexyl itaconate, ditolyl itaconate, dinaphthyl itaconate, dicyclopentyl itaconate, dicyclohexyl itaconate, dibenzyl itaconate, di-(phenethyl) itaconate, di-(ethylphenyl) itaconate, methyl ethyl itaconate, methyl phenyl itaconate, ethyl propyl itaconate, alpha-methylene beta-methyl dimethyl succinate, alpha-methylene, beta-methyl diethyl succinate, alpha-methylene beta-ethyl dimethyl succinate, alpha-methylene beta-propyl diphenyl succinate, alpha-methylene beta-butyl dimethyl succinate, alpha-methylene beta-isobutyl diethyl succinate, etc.

I may also use in addition to the itaconic ester which is copolymerized with the acrylonitrile, esters of an acrylic acid which in themselves copolymerize with acrylonitrile as disclosed in my above-mentioned copending application Serial No. 445,808.

Thus I may use within the limits disclosed in this and my said copending application a mixture comprising acrylonitrile, an itaconic ester having the structural formula

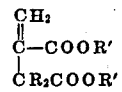

where R is a member of the class consisting of hydrogen and alkyl radicals having no more than four carbon atoms, and R' is a radical selected from the class consisting of alkyl radicals, aralkyl radicals, aryl radicals and alkaryl radicals, and an acrylic ester having the structural formula

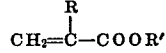

where R is a member of the class consisting of hydrogen and alkyl radicals having no more than four carbon atoms and R' is a radical selected from the class consisting of alkyl radicals, aralkyl radicals, aryl radicals and alkaryl radicals. For example, I may use a polymerizable mass containing 70% by weight acrylonitrile, 20% by weight ethyl acrylate and 10% by weight dibutyl itaconate to produce the oriented copolymeric products.

The fibers and similar articles produced according to this invention may be woven into highly insoluble and chemical resistant cloth for use as filter cloths in handling chemicals and the like. They may also be used for textiles, e. g., cloth, hosiery, etc. Textile materials made from the herein-described fibers, filaments or threads, are superior to silk, cotton, linen, wool, rayon or synthetic condensation polymers from the standpoint of their resistance to water, chemicals, solvents or combination thereof. They are also lighter in weight and considerably tougher and more flexible than the recently developed glass fabrics.

What I claim as new and desire to secure by Letters Patent of the United States is:

1. A molecularly oriented copolymer which exhibits a characteristic crystalline X-ray diffraction pattern, comprising the cold-drawn product of polymerization of a mass containing (1) at least 40% but not more than 80% acrylonitrile and (2) at least one itaconic ester having the structural formula

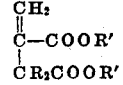

where R is a member of the class consisting of hydrogen and alkyl radicals having no more than four carbon atoms, and R' is a radical selected from the class consisting of alkyl radicals, aralkyl radicals, aryl radicals and alkaryl radicals.

2. A molecularly oriented fiber which exhibits a characteristic crystalline X-ray diffraction pattern which comprises a cold-drawn copolymer of (1) at least 40% but not more than 80% acrylonitrile and (2) at least one itaconic ester having the structural formula

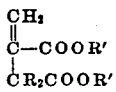

where R is a member of the class consisting of hydrogen and alkyl radicals having no more than four carbon atoms, and R' is a radical selected from the class consisting of alkyl radicals, aralkyl radicals, aryl radicals and alkaryl radicals.

3. A shaped cold-drawn composition comprising a copolymer produced from a polymerizable mass containing (1) at least 40% but less than 80% acrylonitrile and (2) at least 20% but less than 60% of an itaconic ester having the structural formula

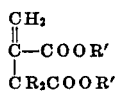

where R is a member of the class consisting of hydrogen and alkyl radicals having no more than four carbon atoms, and R' is a radical selected from the class consisting of alkyl radicals, aralkyl radicals, aryl radicals and alkaryl radicals, said copolymer being molecularly oriented and exhibiting a characteristic crystalline X-ray diffraction pattern.

4. A molecularly oriented copolymer showing a characteristic crystalline X-ray diffraction pattern which comprises the cold-drawn product of polymerization of a mass containing (1) at least 40% but no more than 80% acrylonitrile and (2) diethyl itaconate.

5. A molecularly oriented fiber showing a characteristic crystalline X-ray diffraction pattern which comprises a cold-drawn copolymer of (1) at least 40% but no more than 80% acrylonitrile, (2) diethyl itaconate and (3) another itaconate ester having the structural formula

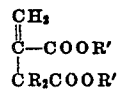

where R is a member of the class consisting of hydrogen and alkyl radicals having no more than four carbon atoms, and R' is a radical selected from the class consisting of alkyl radicals, aralkyl radicals, aryl radicals and alkaryl radicals.

6. A fiber as in claim 5 wherein the cold-drawn copolymer is a copolymer of 70% acrylonitrile, 25% dibutyl itaconate and 5% diethyl itaconate.

7. A molecularly oriented copolymer showing a characteristic crystalline X-ray diffraction pattern which comprises the cold-drawn product of polymerization of a mass containing (1) at least 40% but no more than 80% acrylonitrile, (2) an itaconic ester having the structural formula

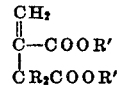

where R is a member of the class consisting of hydrogen and alkyl radicals having no more than four carbon atoms, and R' is a radical selected from the class consisting of alkyl radicals, aralkyl radicals, aryl radicals and alkaryl radicals, and (3) an acrylic ester having the structural formula

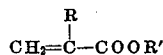

where R is a member of the class consisting of hydrogen and alkyl radicals having no more than four carbon atoms and R' is a radical selected from the class consisting of alkyl radicals, aralkyl radicals, aryl radicals and alkaryl radicals.

8. A product as in claim 7 where the cold-drawn copolymer is a copolymer of 70% acrylonitrile, 20% ethyl acrylate and 10% dibutyl itaconate.

GAETANO F. D'ALELIO.